Aug. 28, 1928.

D. E. HENNESSY 1,682,124

METHOD OF MANUFACTURING RUBBER TUBES

Original Filed April 28, 1922

DANIEL E. HENNESSY
INVENTOR

BY
ATTORNEY

Patented Aug. 28, 1928.

1,682,124

UNITED STATES PATENT OFFICE.

DANIEL E. HENNESSY, OF AKRON, OHIO, ASSIGNOR TO THE FISK RUBBER COMPANY, OF CHICOPEE FALLS, MASSACHUSETTS, A CORPORATION OF MASSACHUSETTS.

METHOD OF MANUFACTURING RUBBER TUBES.

Original application filed April 28, 1922, Serial No. 557,206. Divided and this application filed June 1, 1926. Serial No. 112,848.

My invention relates to the manufacture of rubber tubes and more particularly to tubes of the character used as inner tubes in pneumatic tire casings. In the manufacture of such tubes it has been customary to prevent blowing of the tube during vulcanization by binding the ends of the tube to the mandrel with a wrapping of fabric tape.

It is the object of my invention to provide a method of curing rubber tubes without such confining means, and accordingly without the attendant expense of the fabric wrapping material. In my co-pending application, Serial Number 557,206 filed April 28, 1922, of which this application is a division, I have claimed a device for doing away with the fabric wrapping. My present method, while useful in conjunction with the device of said applications, permits curing of such tubes without the application of exterior confining pressure of any kind.

In the drawings which illustrate one manner of carrying out my method

Figure 1:
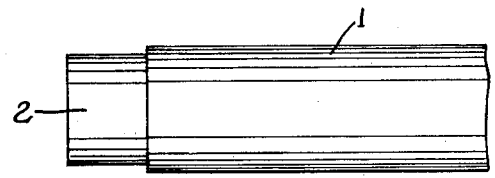
Figure 1 shows an uncured inner tube positioned on a mandrel.
Figure 2:
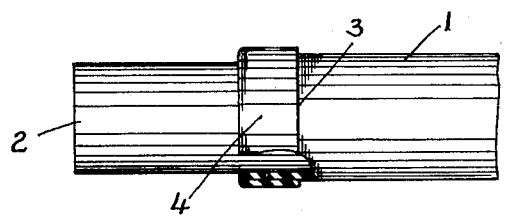
Figure 2 shows the tube turned back to expose a portion of the inner surface.
Figure 3:
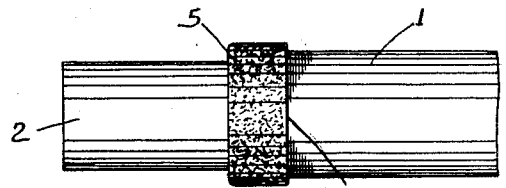
Figure 3 shows adhesive applied to this exposed portion.
Figure 4:
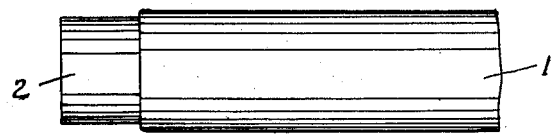
Figure 4 shows the turned back portion replaced and lying against the mandrel.

In carrying out my invention according to the embodiment herein illustrated, I form or position the inner tube 1 on the mandrel 2 as shown in Figure 1 by any suitable method and then roll back the ends of the tube 1 to form cuffs 3 as shown in Figure 2. This exposes the inner surface of the tube at 4 and to these exposed portions of the inner surface I apply rubber cement as shown at 5 in Figure 3 and then replace the cuff against the tube as shown in Figure 4 whereupon the tube is joined to the pole at the ends by the applied cement 5. The mandrel and tube is then placed in any suitable type of vulcanizer and cured.

It will be understood that the specific embodiment of my invention above described is illustrative only and my invention is not limited thereto.

I claim:

1. The method of curing rubber tubes upon a mandrel which comprises interposing a film of cement between the ends of the tube and the mandrel and vulcanizing the tube.

2. The method of manufacturing rubber tubes which comprises positioning the tube upon a mandrel, interposing a film of cement between the ends of the tube and the mandrel and vulcanizing the tube.

3. The method of manufacturing rubber tubes which comprises positioning the tube upon a mandrel, turning back the end portions of the tube, applying cement to the turned back portion, replacing the latter in original position and vulcanizing the tube.

4. The method of manufacturing rubber tubes which comprises forming the tube upon a mandrel, turning back the end portions of the tube, applying rubber cement over the turned back portion, replacing the latter in original position and vulcanizing the tube.

In testimony whereof I have signed my name to the above specification.

DANIEL E. HENNESSY.